United States Patent
Lin

(10) Patent No.: US 7,995,105 B2
(45) Date of Patent: Aug. 9, 2011

(54) BRIGHTNESS ADJUSTING METHOD

(75) Inventor: Jhe-Hong Lin, Hsinchu County (TW)

(73) Assignee: Altek Corporation, Science Park, Hsinchu (TW)

( * ) Notice: Subject to any disclaimer, the term of this patent is extended or adjusted under 35 U.S.C. 154(b) by 1147 days.

(21) Appl. No.: 11/785,450

(22) Filed: Apr. 18, 2007

(65) Prior Publication Data

US 2008/0158410 A1  Jul. 3, 2008

(30) Foreign Application Priority Data

Dec. 28, 2006 (TW) ................... 95149371 A

(51) Int. Cl.
*H04N 5/235* (2006.01)
*G06K 9/40* (2006.01)

(52) U.S. Cl. .............. 348/221.1; 348/229.1; 382/274

(58) Field of Classification Search ........ 348/221.1, 348/229.1, 362, 364; 382/274
See application file for complete search history.

(56) References Cited

U.S. PATENT DOCUMENTS

| | | | | |
|---|---|---|---|---|
| 7,129,980 B1 * | 10/2006 | Ashida | | 348/333.04 |
| 7,173,663 B2 * | 2/2007 | Skow et al. | | 348/364 |
| 7,289,154 B2 * | 10/2007 | Gindele | | 348/364 |
| 7,667,765 B2 * | 2/2010 | Turley et al. | | 348/364 |
| 7,800,686 B2 * | 9/2010 | Meguro et al. | | 348/361 |
| 2002/0034336 A1 * | 3/2002 | Shiota et al. | | 382/274 |
| 2002/0140840 A1 * | 10/2002 | Kindaichi | | 348/348 |
| 2003/0067551 A1 * | 4/2003 | Venturino et al. | | 348/364 |
| 2003/0122939 A1 * | 7/2003 | Bell et al. | | 348/229.1 |
| 2003/0184659 A1 * | 10/2003 | Skow | | 348/223.1 |
| 2003/0184673 A1 * | 10/2003 | Skow | | 348/364 |
| 2004/0091169 A1 * | 5/2004 | Park et al. | | 382/274 |
| 2007/0092136 A1 * | 4/2007 | Zhao et al. | | 382/169 |
| 2007/0110330 A1 * | 5/2007 | Chauville et al. | | 382/274 |
| 2007/0279500 A1 * | 12/2007 | Castorina et al. | | 348/254 |
| 2008/0069444 A1 * | 3/2008 | Wilensky | | 382/173 |
| 2010/0165135 A1 * | 7/2010 | Kalevo | | 348/221.1 |

\* cited by examiner

*Primary Examiner* — Lin Ye
*Assistant Examiner* — Chia-Wei A Chen
(74) *Attorney, Agent, or Firm* — Winston Hsu; Scott Margo

(57) ABSTRACT

A brightness adjusting method used in an image-retrieving system for producing a suitable brightness adjusting value, the image-retrieving system having a filter and defining a first threshold value, a second threshold value set, a third threshold value, and a fourth threshold value, the second threshold value set including a high value and a low value.

12 Claims, 7 Drawing Sheets

BRIGHTNESS ADJUSTING METHOD

FIELD OF THE INVENTION

The present invention relates to a brightness adjusting method used in an image-retrieving system, especially to a method for adjusting the brightness of an image captured by a digital image electronic product.

BACKGROUND OF THE INVENTION

A conventional exposure control method of the digital camera as disclosed in the U.S. Pat. No. 5,703,644 is to divide the captured image frame into a plurality of regions; and to determine based on the luminance value whether the picture is taken indoor or outdoor using zone light metering so as to partition the target object and the background. Afterwards, the difference between a luminance of the region where the target object is present and a luminance of the remaining portion of the image frame are measured to decide whether the object stands toward or against the light source. At the same time, an appropriate luminance adjusting value (i.e. exposure compensation value) is obtained by analyzing the value of average luminance of the bright region or the dark region, and the backlight degree or the frontlight degree using Fuzzy Theory. The above method, however, may cause invalid light metering as the target object moves or as the camera rotates.

Another conventional exposure control method as disclosed in the U.S. Pat. No. 6,690,424 is to define two luminance reference levels using the value of average luminance of the entire picture (or scene), an object scene portion in the picture is separated from a background portion on the basis of the luminance reference level. The value of the average luminance and the luminance difference of the entire picture and the object scene portion are respectively found, and based on this luminance difference, the luminance adjusting value for the object scene portion is determined. This method, however, is not suitable as the object scene portion is over-exposed.

Additionally, an orientation sensor is required to detect whether the picture was taken vertically or horizontally while using the conventional matrix light metering, so as to determine which metering matrix should be implemented. An inappropriate light metering value may be generated if there is an error occurred in detection.

While using a digital camera, if there is over-exposure (i.e. signal over saturated), the detail of the target object will disappear as shown in FIG. 4a; if there is under-exposure (i.e. signal weak), the detail of the target object will not be rendered, as illustrated in FIG. 5a.

SUMMARY OF THE INVENTION

One aspect of the present invention is to provide a suitable brightness adjusting value by analyzing the exposure degree of a scene without using an orientation sensor.

Another aspect of the present invention is to analyze the details of an image and divide the image into a fine detail area and a blurred area (e.g. caused by under-exposure or over-exposure) with a filter and a suitable selection of the threshold value.

Another aspect of the present invention is to determine whether to implement the brightness adjustment in the blurred areas by analyzing the size of those areas.

Another aspect of the present invention is to determine the brightness adjusting value for the blurred area by analyzing the brightness level (or brightness ratio) of the blurred area.

The aspects described above are accomplished by a brightness adjusting method used in an image-retrieving system, for producing a suitable brightness adjusting value, the image-retrieving system having a filter and defining a first threshold value, a second threshold value set, a third threshold value, and a fourth threshold value, the second threshold value set including a high value and a low value, comprising the steps as follow: disable the filter and retrieve a first picture of a scene, the first picture having a plurality of pixels and a brightness value of each pixel is obtained; enable the filter and retrieve a second picture of the same scene, the second picture having a plurality of pixels and a brightness value of each pixel is obtained; the brightness value of each pixel in the second picture is compared with the first threshold value so as to obtain a fine detail area and a blurred area in the first picture; for each pixel in the blurred areas, by respectively using the high value and the low value of the second threshold value set to determine an over-exposure area and a under-exposure area in the blurred areas according to the brightness value of each pixel in the first picture, and calculate the area sum of the over-exposure areas, A1, and the area sum of the under-exposure areas, A2; based on a result after comparing the third threshold value with A1 and/or A2, determine whether to adjust the brightness value of the pixels in the over-exposure areas and/or under-exposure areas; and determine the brightness adjusting value for the pixels in the first picture based on the fourth threshold value, a desired brightness value $BV_{target}$, an average brightness value of all pixels in the over-exposure areas, $BV_{a1}$, and an average brightness value of all pixels in the under-exposure areas, $BV_{a2}$.

In the present invention, even if the target object does not locate in the center of the picture, a suitable brightness value and fine details of a target object is obtained.

BRIEF DESCRIPTION OF DRAWINGS

The foregoing and advantages of the invention will be appreciated more fully from the following further description thereof with reference to the accompanying drawings wherein.

DETAILED DESCRIPTION OF SPECIFIC EMBODIMENTS

The purposes, functions, and features of the present invention as described above will be further understood with the exemplary embodiments and the appended drawings.

Figure 1:
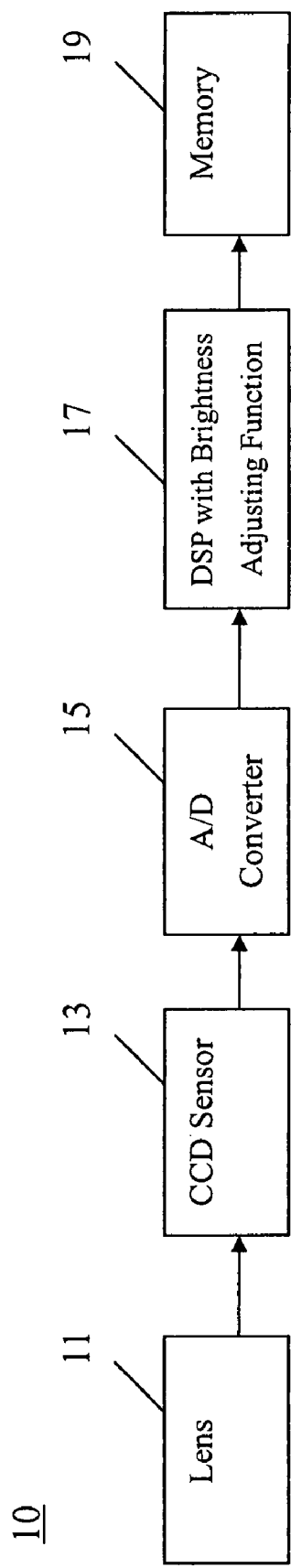
FIG. 1 shows an image-retrieving system in which the present invention is deployed.

FIG. 1 shows an image-retrieving system 10 in which the present invention is deployed, including lens 11, CCD sensor 13, A/D converter 15, digital signal processor (DSP) 17, and memory 19. In system 10, an image is captured through the lens 11 and the light signal of the image is sent to the CCD sensor 13 and processed. After that, an analog electric signal of the image is inputted into the A/D converter 15, in which the analog electric signal is converted to a digital electric signal, which is inputted into the DSP 17. DSP 17 has the brightness adjusting function of the present invention that is performed by a brightness adjusting unit (hardware and/or software). The brightness adjusting unit includes a brightness adjuster, which is capable of fine tuning the pixels of the captured image. The DSP 17 includes a digital filter (not shown) coordinating with software program, such that the brightness difference between the pixels is enhanced to distinguish the fine detail area and the blurred area. In addition to the digital filter, the filter function is achieved with other equivalent mechanisms or means. The DSP 17 stores the digital electric signals processed by the above steps to the memory 19. In an exemplary embodiment, the image-retrieving system 10 is a digital still camera. In another exemplary embodiment, the image-retrieving system 10 is a digital video camera. In another exemplary embodiment, the image-retrieving system 10 is a camera-mobile phone.

Figure 2A:
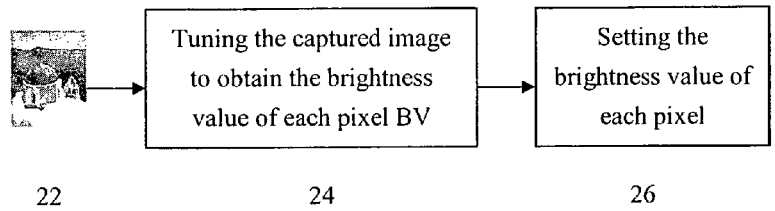
FIG. 2a shows the operating steps of a conventional brightness adjusting unit.
Figure 2B:
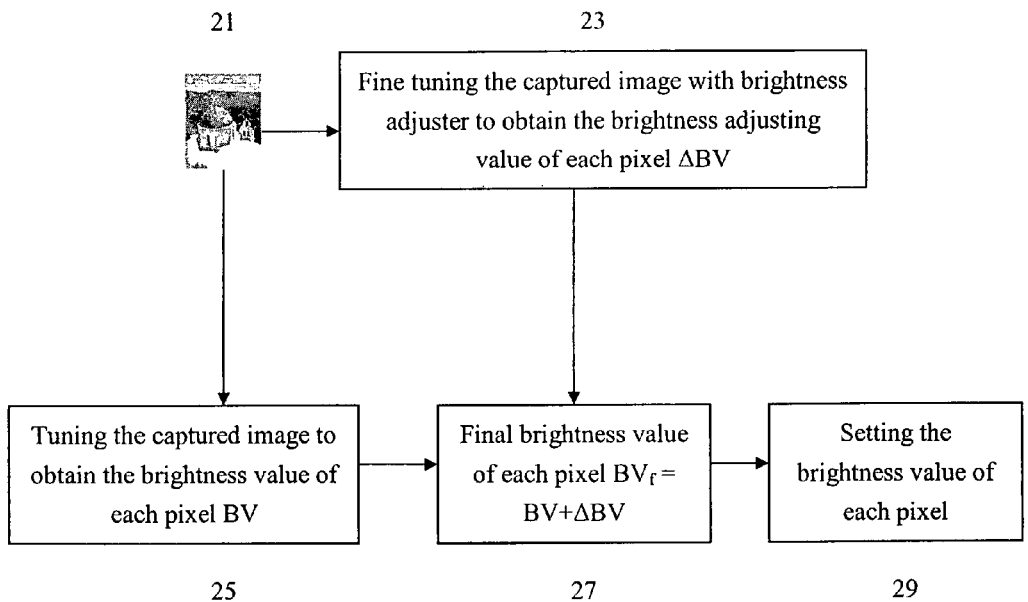
FIG. 2b shows the operating steps of the present invention.

FIG. 2a represents the conventional brightness adjusting unit 20a in an image-retrieving system. As shown in step 24, after the image digital electric signal corresponding to the scene 22 is inputted to the unit 20a, the signal is tuned with the conventional method to obtain the brightness value of each pixel, BV. In step 26, the brightness value of the pixel thus will be set according to BV. FIG. 2b shows the brightness adjusting unit 20b in the image-retrieving system 10 of the present invention. In step 23 (see the embodiment shown in FIG. 3 for detail), the DSP 17 obtains the brightness adjusting value for each pixel, $\Delta BV$, in the picture, and the brightness value of each pixel, BV, is obtained in step 25. In step 27, the final brightness value of each pixel, $BV_f$, is calculated and is the area sum of the brightness adjusting value for each pixel, $\Delta BV$, and the brightness value of each pixel, BV. The brightness value of each pixel will be set in accordance with the final brightness value of each pixel, $BV_f$, as shown in step 29.

Figure 3:
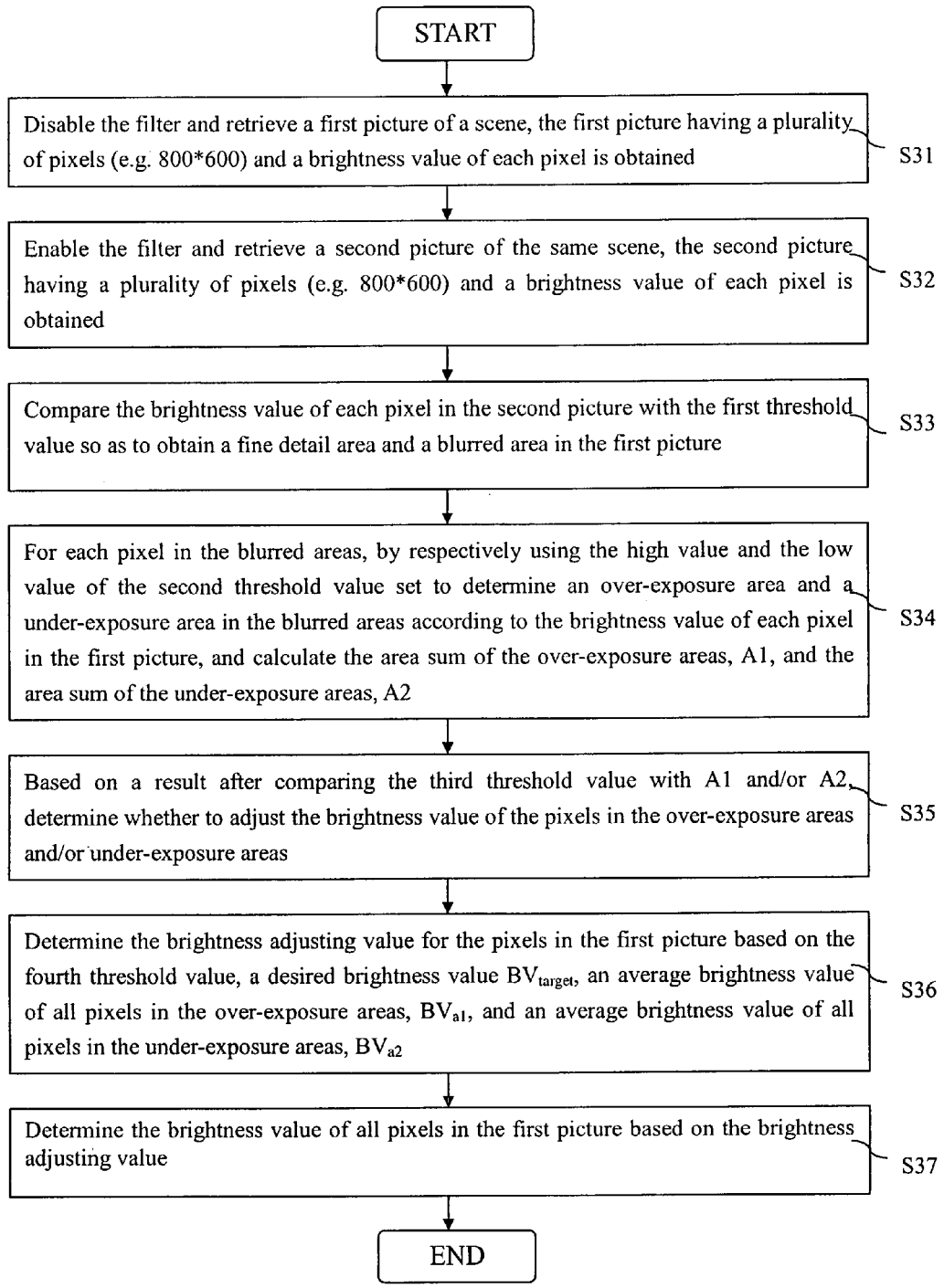
FIG. 3 shows the brightness adjusting method of the present invention.

Steps S31 to S36 in FIG. 3 illustrate the brightness adjusting process (i.e. step 23) of the above brightness adjusting unit 20b for obtaining a suitable brightness adjusting value. A more specific description is provided as follows for the conditions of over-exposure and under-exposure. First of all, a first threshold value, a second threshold value set, a third threshold value, and a fourth threshold value are defined in the system 10 of FIG. 1, and the second threshold value set includes a high value and a low value. The first threshold value is compared with the brightness value of each pixel in the picture of a scene obtained while enabling the filter (second picture) so as to determine whether a pixel in the picture of the same scene obtained while disabling the filter (first picture) is blurred area. The second threshold value set is compared with the brightness value of each pixel in the picture obtained while disabling the filter, corresponding to the blurred area. If the brightness value of the pixel is greater than the high value, such pixel is an over-exposure area, however, if the brightness value of the pixel is smaller than the low value, such pixel is an under-exposure area. The third threshold value may be an area value, which is respectively compared with the area sum of all over-exposed pixels, A1, in the blurred area and the area sum of all under-exposed pixels, A2, in the blurred area so as to determine whether to adjust the brightness values of these pixels. The fourth threshold value may be a brightness ratio. For example, the brightness adjusting value for each pixel is determined by comparing the ratio of the average brightness value of the over-exposed pixels, $BV_{a1}$, to the desired brightness value of 18% exposure, $BV_{18\%}$, or the ratio of the average brightness value of the under-exposed pixels, $BV_2$, to the desired brightness value of 18% exposure, $BV_{18\%}$, with the fourth threshold value.

Figure 4A:
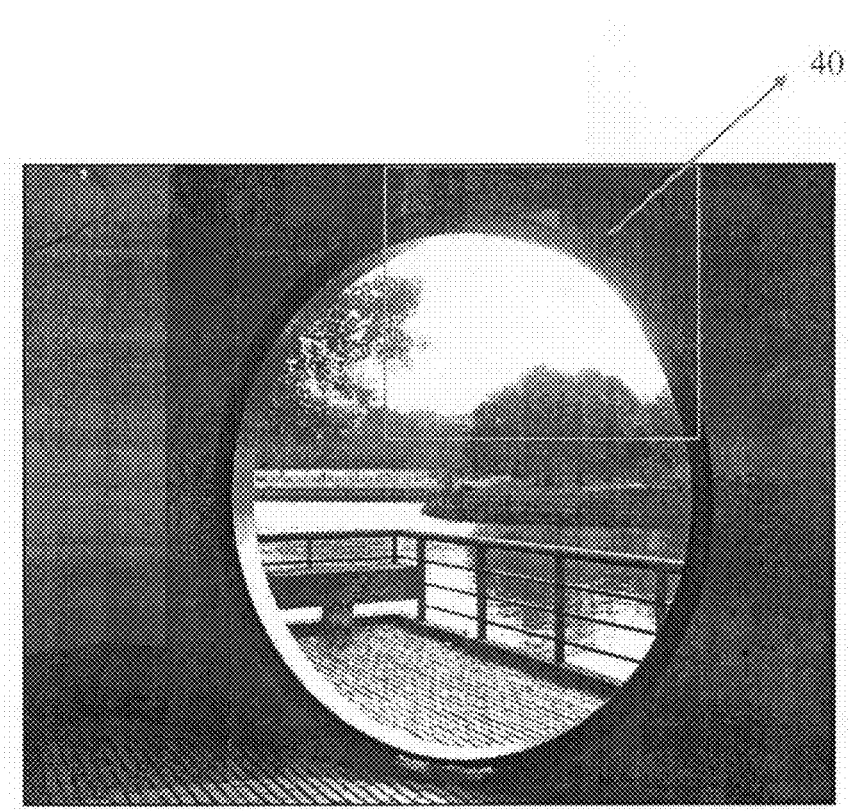
FIG. 4a is an image captured while disabling the filter.
Figure 4B:
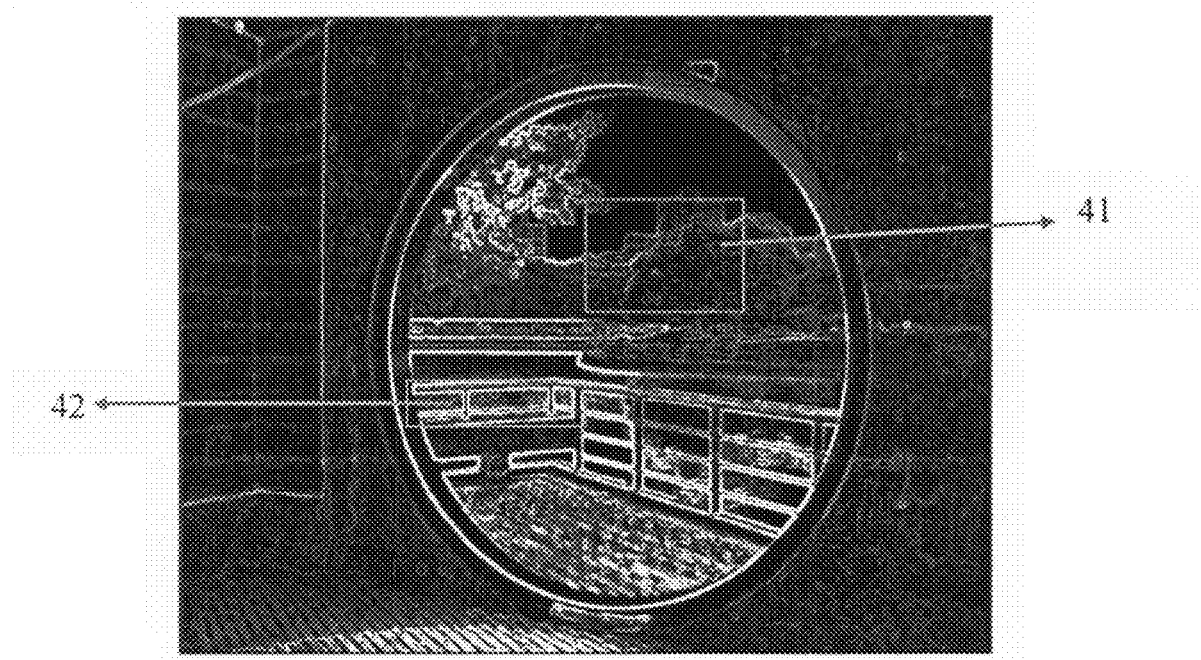
FIG. 4b is an image captured while enabling the filter.
Figure 4C:
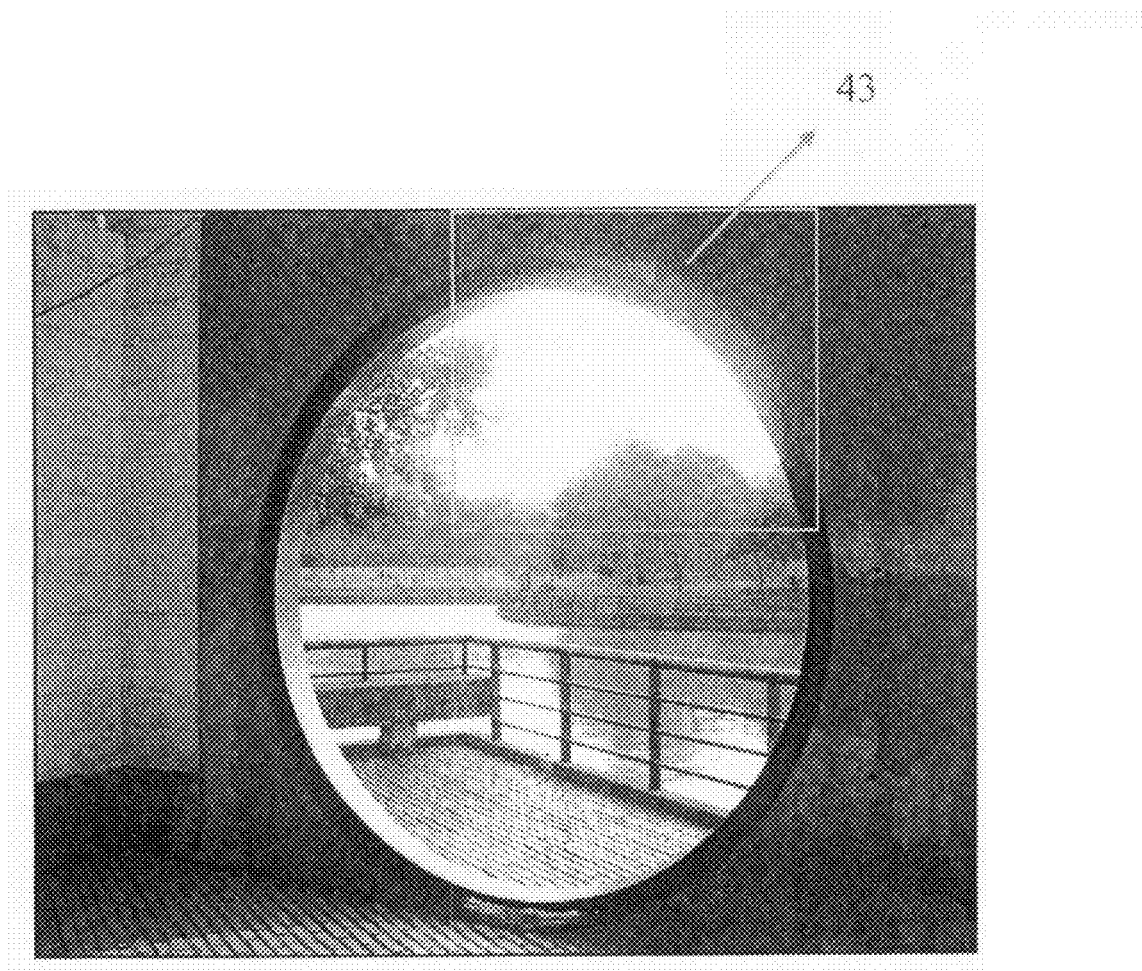
FIG. 4c, corresponding to FIG. 4a, is an image captured using the brightness adjusting method of the present invention.

Steps S31 to S36 in FIG. 3 accompanying with FIGS. 4a to 4c further illustrate how to enhance the over-exposed pixels under the condition of over-exposure in certain embodiments of the present invention. FIG. 4a is an image captured before the brightness adjustment, FIG. 4b, corresponding to FIG. 4a, is an image obtained while enabling the filter, and FIG. 4c is an image obtained after the brightness adjustment.

First, as shown in FIG. 4a, by disabling the filter in S31, a plurality of pixels, e.g. 800*600, of a first picture of a scene is captured, and the brightness value of each pixel is calculated. The area 40 is over-exposed and in which the detail of target object disappears.

Secondly, as shown in FIG. 4b, by enabling the filter in S32, a plurality of pixels, e.g. 800*600, of a second picture of the same scene is captured, and the brightness value of each pixel is calculated.

In S33, the first threshold value is compared with the brightness value of each pixel in the second picture so as to determine the blurred areas in the first picture. In S34, the second threshold value set is compared with the brightness value of each pixel in the blurred areas of the first picture so as to determine the pixel is over-exposed or under-exposed. For instance, that if the brightness value of the pixel is greater than the high value of the second threshold value set, the pixel is over-exposed; if the brightness value of the pixel is smaller than the low value of the second threshold value set, the pixel is under-exposed.

In FIG. 4b, after S34, for example, the pixel in area 41 is determined as the over-exposed blurred area, and the pixel in area 42 is determined as the appropriately-exposed fine detail area. Specifically, the first threshold value and a suitable high value or low value of the second threshold value set is determined by experiments and statistical results with designer's experiences. As the range of brightness value is chosen as being from 0 to 255, for example, the first threshold value may be 50, the high value of the second threshold value set may be 150 and the low value may be 80. The brightness value of the pixel in the first picture corresponding to the area 41 is 160, which is greater than the high value of the second threshold value 150, thus such pixel is an over-exposure area. In the second picture, however, the brightness value of the pixel is 30, which is smaller than the first threshold value 50, thus such pixel is also a blurred area. The brightness value of the pixel in the first picture corresponding to the area 42 is 100, which is between the high value and the low value of the second threshold value set, thus the pixel is an appropriate exposure area. In the second picture, however, the brightness value of the pixel is 160, which is greater than the first threshold value, thus the pixel is also a fine detail area. By the time S34 is completed, the system 10 is able to obtain the area sum of the over-exposed pixels, A1, and the area sum of the under-exposed pixels, A2.

In S35, determine whether to adjust the brightness value of the pixel in the over-exposure area and under-exposure area based on the result after comparing the third threshold value with A1 and A2. In an alternative embodiment, the third threshold value may be the ratio of the over-exposure area to the total area of the entire picture. Assume the third threshold value is 8% and the total over-exposure area is 3% of the total area of the entire picture, 3% is smaller than the third threshold value, such that the pixel brightness does not have to be adjusted. In FIG. 4a, the over-exposure area 40 is 16% of the total area of the first picture; this ratio is greater than the third threshold value, such that the pixel brightness needs to be adjusted. If in step S35 the pixel brightness is determined as needing adjustment, S36 will then be implemented.

In S36, the brightness adjusting value for the pixels in the picture is determined by the ratio of the average brightness value of all pixels in the over-exposure area, $BV_{a1}$, to a target brightness value $BV_{target}$, or the ratio of the average brightness value of all pixels in the under-exposure area, $BV_{a2}$, to the target brightness value $BV_{target}$. In an exemplary embodiment, the brightness value of each pixel in the picture is determined by comparing the fourth threshold value with $BV_{a1}/BV_{target}$ or $BV_{a2}/BV_{target}$. Once the brightness adjusting value for the pixel is determined, the brightness value of each pixel or the selected pixels can be adjusted. In an exemplary embodiment, brightness value of the pixel in the over-exposure areas and the under-exposure areas in a picture is adjusted respectively or simultaneously. In FIG. 4a, the brightness adjusting value is −50 for the pixel in the over-exposure area 40 and −20 for the pixel in the appropriate exposure area so that the picture shown in FIG. 4c is generated. By comparing the area 43 in FIG. 4c with the area 40 in FIG. 4a, it shows that the detail of target object in area 43 has not only become clear and also the variation in brightness of each pixel in the entire picture is much smoother.

Figure 5A:
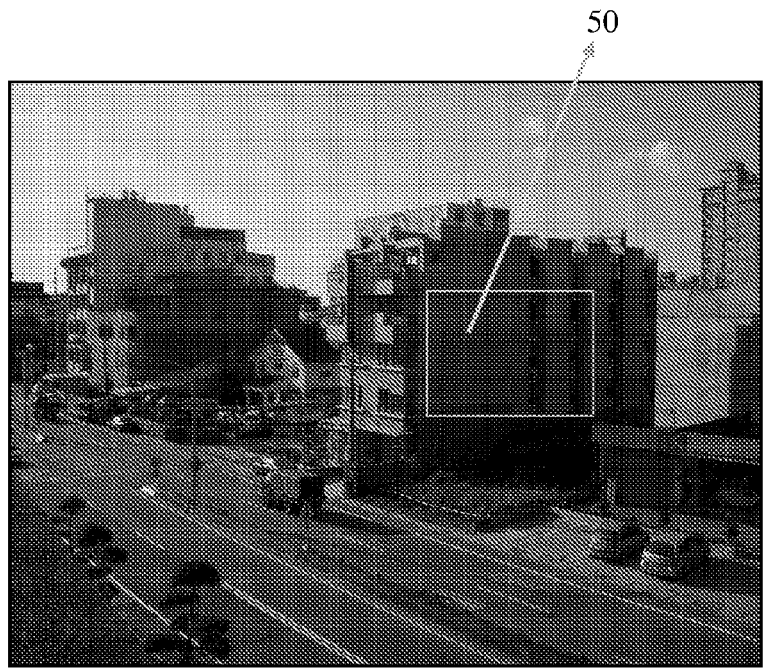
FIG. 5a is an image captured while disabling the filter.
Figure 5B:
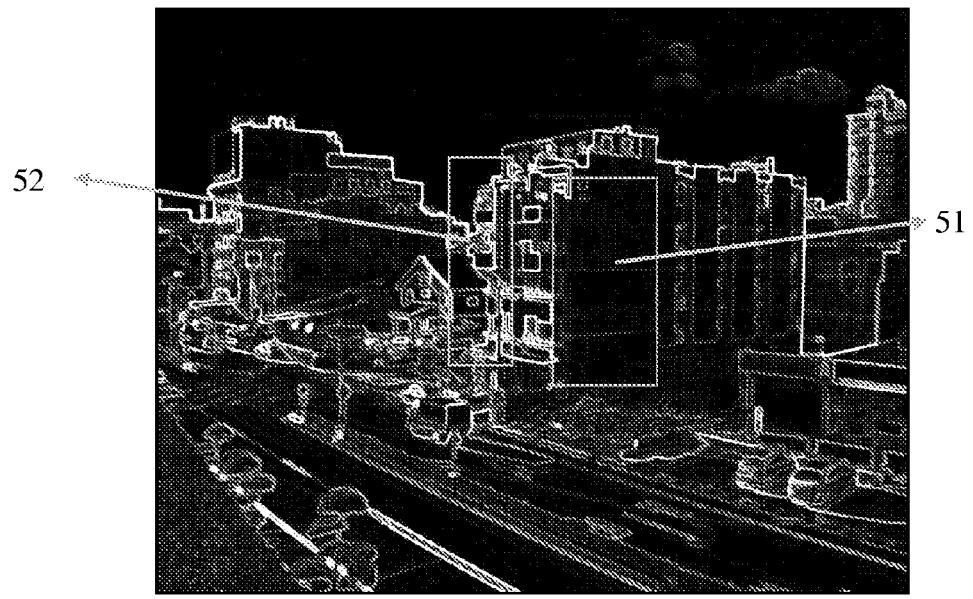
FIG. 5b is an image captured while enabling the filter.
Figure 5C:
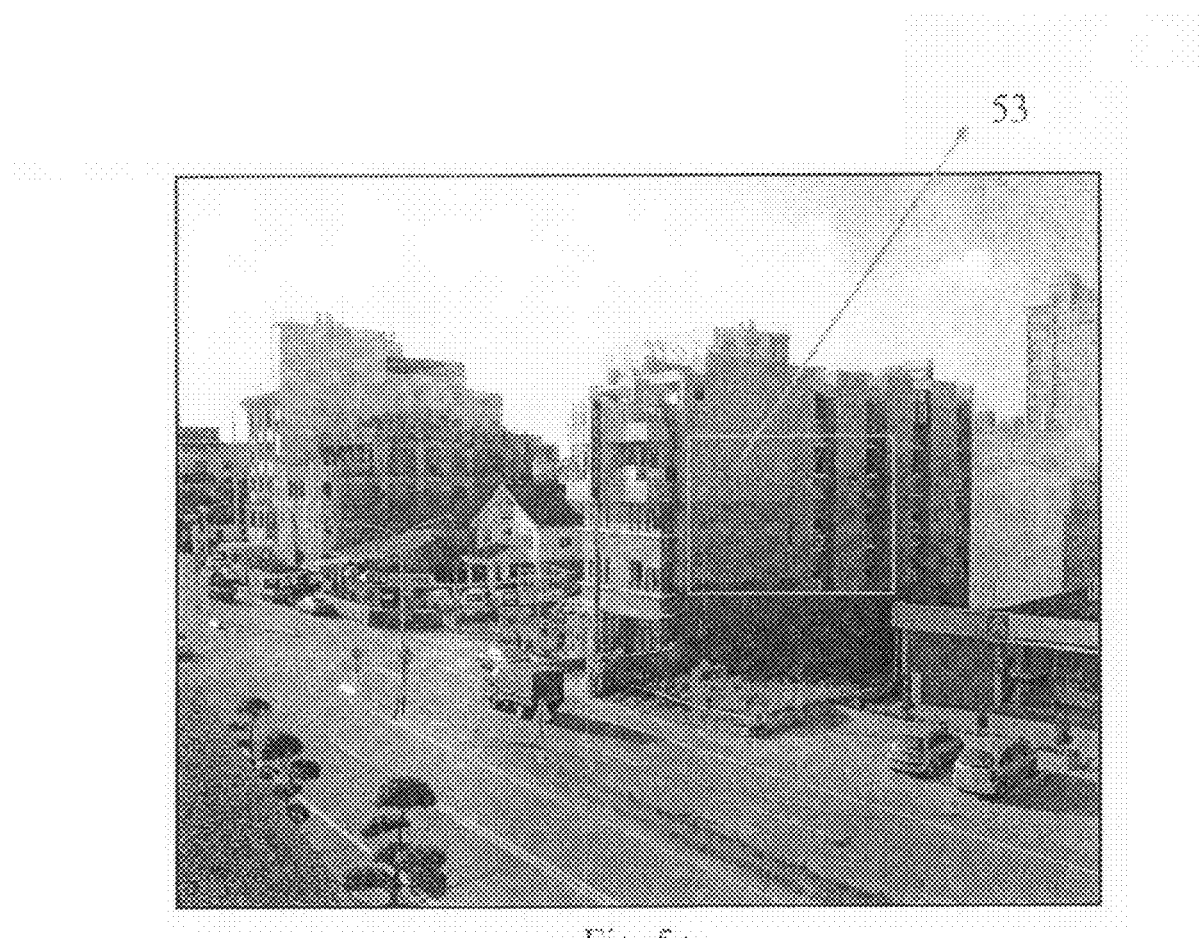
FIG. 5c, corresponding to FIG. 5a, is an image captured using the brightness adjusting method of the present invention.

Similarly, steps S31 to S36 in FIG. 3 accompanying with FIGS. 5a to 5c illustrate how to enhance the under-exposure areas. FIG. 5a is an image captured before the brightness adjustment, FIG. 5b is an image obtained while enabling the filter, and FIG. 5c is an image obtained after the brightness adjustment.

FIG. 5a contains an under-exposure area 50. After completing the steps: S32, S33, and S34, an appropriate exposure area 52 and an under-exposure area 51 are defined. The brightness value of the pixel in area 51 is smaller than the low value of the second threshold value set. By the time S34 is completed, the area sum of the over-exposed pixels, A1, and the area sum of the under-exposed pixels, A2, are obtained by the system 10.

After S35, to determine whether to adjust the brightness values of the pixels in the over-exposure area and under-exposure area as described above.

After S36, the brightness adjusting value for the pixels in the picture is determined. In an exemplary embodiment, once the brightness adjusting value for the pixel is determined, the brightness value of each pixel or the selected pixels can be adjusted. In an exemplary embodiment, the brightness value of each pixel in the over-exposure areas and the under-exposure areas is adjusted respectively or simultaneously. In FIG. 5a, the brightness adjusting value is +50 for the pixels in the under-exposure area 50 and +20 for the pixels in the appropriate exposure area 52 so that the picture shown in FIG. 5c is generated. By comparing the area 53 in FIG. 5c with the area 50 in FIG. 5a, it shows that the detail of target object in area 53 has not only become clear and also the variation in brightness of each pixel has become much smoother.

Although the present invention is disclosed with detailed description of the preferable embodiments as described above, it is not used to limit the present invention; this invention could be modified or improved on the precondition of keeping its spirit and category. Thus, the interested field of this invention is defined in the claims as follow.

What is claimed is:

1. A brightness adjusting method used in an image-retrieving apparatus for producing a suitable brightness adjusting value, said image-retrieving apparatus having a filter and defining a first threshold value, a second threshold value set, a third threshold value, and a fourth threshold value, said second threshold value set including a high value and a low value, comprising the steps as follow:
   a. disable the filter and retrieve a first picture of a scene, the first picture having a plurality of pixels and a brightness value of each pixel is obtained;
   b. enable the filter and retrieve a second picture of the same scene, the second picture having a plurality of pixels and a brightness value of each pixel is obtained;
   c. compare the brightness value of each pixel in the second picture with the first threshold value so as to obtain a fine detail area and a blurred area in the first picture;
   d. for each pixel in the blurred areas, by respectively using the high value and the low value of the second threshold value set to determine an over-exposure area and an under-exposure area in the blurred areas according to the brightness value of each pixel in the first picture, and calculate the area sum of the over-exposure areas, A1, and the area sum of the under-exposure areas, A2;
   e. based on a result after comparing the third threshold value with A1 and/or A2, determine whether to adjust the brightness value of the pixels in the over-exposure areas and/or under-exposure areas; and
   f. determine the brightness adjusting value for the pixels in the first picture based on the fourth threshold value, a desired brightness value $BV_{target}$, an average brightness value of all pixels in the over-exposure areas, $BV_{a1}$, and an average brightness value of all pixels in the under-exposure areas, $BV_{a2}$.

2. A method according to claim 1, further comprising: a step to determine the brightness value for all pixels in the first picture according to the brightness adjusting value.

3. A method according to claim 1, wherein the order of steps a and b can be interchanged.

4. A method according to claim 1, wherein when the brightness value of a pixel is lower than the first threshold value, said pixel is regarded as blurry.

5. A method according to claim 1, wherein when the size of the under-exposure areas or the size of the over-exposure areas is greater than the third threshold value, the brightness value of each pixel in the first picture is to be adjusted.

6. A method according to claim 1, wherein the brightness adjusting value for the over-exposure areas, and/or the brightness adjusting value for the under-exposure areas, and/or the brightness adjusting value for an appropriate exposure area are respectively determined.

7. A method according to claim 1, wherein the ratio of $BV_{a1}$ to $BV_{target}$ and the ratio of $BV_{a2}$ to $BV_{target}$ are compared with the fourth threshold value to determine the brightness adjusting value for each pixel.

8. A method according to claim 1, wherein the ratio of $BV_{a1}$ to $BV_{target}$ is compared with the fourth threshold value to determine the brightness adjusting value for each pixel.

9. A method according to claim 1, wherein the ratio of $BV_{a2}$ to $BV_{target}$ is compared with the fourth threshold value to determine the brightness adjusting value for each pixel.

10. A method according to claim 1, wherein said image-retrieving apparatus is a digital still camera.

11. A method according to claim 1, wherein said image-retrieving apparatus is a digital video camera.

12. A method according to claim 1, wherein said image-retrieving apparatus is a camera mobile-phone.

* * * * *